(12) United States Patent
Mignogna et al.

(10) Patent No.: US 10,017,590 B2
(45) Date of Patent: Jul. 10, 2018

(54) CATALYST COMPONENTS FOR THE POLYMERIZATION OF OLEFINS

(71) Applicant: BASELL POLIOLEFINE ITALIA S.R.L., Milan (IT)

(72) Inventors: Alessandro Mignogna, Ferrara (IT); Giampiero Morini, Ferrara (IT); Reynald Chevalier, Frankfurt (DE)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 15/557,011

(22) PCT Filed: Mar. 7, 2016

(86) PCT No.: PCT/EP2016/054772
§ 371 (c)(1),
(2) Date: Sep. 8, 2017

(87) PCT Pub. No.: WO2016/142334
PCT Pub. Date: Sep. 15, 2016

(65) Prior Publication Data
US 2018/0057620 A1    Mar. 1, 2018

(30) Foreign Application Priority Data
Mar. 10, 2015 (EP) .................... 15158458

(51) Int. Cl.
| | |
|---|---|
| C08F 4/649 | (2006.01) |
| C08F 4/651 | (2006.01) |
| C08F 4/654 | (2006.01) |
| C08F 4/655 | (2006.01) |
| C08F 110/06 | (2006.01) |
| C08F 4/645 | (2006.01) |

(52) U.S. Cl.
CPC ............ C08F 110/06 (2013.01); C08F 4/649 (2013.01); C08F 4/6455 (2013.01); C08F 4/6457 (2013.01); C08F 4/6495 (2013.01); C08F 4/6498 (2013.01); C08F 2410/01 (2013.01)

(58) Field of Classification Search
CPC .... C08F 4/6455; C08F 4/6457; C08F 4/6494; C08F 4/6495; C08F 4/6498; C08F 4/649
See application file for complete search history.

(56) References Cited

U.S. PATENT DOCUMENTS

| 9,481,745 B2 * | 11/2016 | Mignogna ............ C07C 271/12 |
| 2008/0194782 A1 | 8/2008 | Uhrhammer et al. |
| 2012/0322964 A1 | 12/2012 | Chen et al. |

FOREIGN PATENT DOCUMENTS

| EP | 2712875 A1 | 4/2014 |
| JP | 2008533241 A | 8/2008 |
| JP | 2008533243 A | 8/2008 |
| WO | 2011106497 A1 | 9/2011 |
| WO | 2011106500 A1 | 9/2011 |

OTHER PUBLICATIONS

International Search Report and Written Opinion dated May 17, 2016 (dated May 17, 2016) for Corresponding PCT/EP2016/054772.

* cited by examiner

*Primary Examiner* — Caixia Lu

(57) ABSTRACT

A solid catalyst component for the polymerization of olefins made from or containing Mg, Ti, halogen and an electron donor of formula (I) or (II)

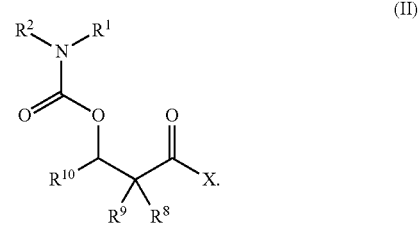

(I)

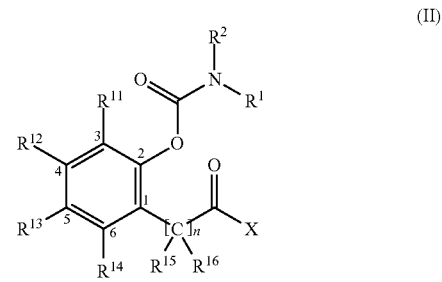

(II)

When activated with an aluminum alkyl and optionally an external electron donor, solid catalyst component can give high activity and stereospecificity in the polymerization of olefins.

15 Claims, No Drawings

CATALYST COMPONENTS FOR THE POLYMERIZATION OF OLEFINS

This application is the U.S. National Phase of PCT International Application PCT/EP2016/054772, filed Mar. 7, 2016, claiming benefit of priority to European Patent Application No. 15158458.8, filed Mar. 10, 2015, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to catalyst components for the polymerization of olefins made from or containing a Mg dihalide based support on which are supported Ti atoms and an electron donor compound containing an ester and a carbamate substituent group. The present disclosure further relates to the catalysts obtained from the components and to their use in processes for the polymerization of olefins.

BACKGROUND OF THE INVENTION

Concerning the polymerization of propylene, the Ziegler-Natta catalysts can be made from or contain a solid catalyst component, constituted by a magnesium dihalide on which are supported a titanium compound and an internal electron donor compound, used in combination with an Al-alkyl compound. When higher crystallinity of the polymer is desired, an external donor can be used to obtain higher isotacticity. One of the largely used classes of internal donors is constituted by the esters of phthalic acid, (such as for example diisobutylphthalate]. The phthalates are used as internal donors in combination with alkylalkoxysilanes as external donor. This catalyst system gives good performances in terms of activity, isotacticity and xylene insolubility.

The use of this catalyst system has raised health concerns with the use of phthalates.

Some of the tested catalysts contain donors structures having contemporaneously amido groups and ester groups. PCT Publication No. WO2006/110234 describes amino acid derivatives including one carbamate group and one free ester function. The catalysts generated by these structures have very low activity and sterospecificity in bulk propylene polymerization (See Table 2 of PCT Publication No. WO2006/110234).

SUMMARY OF THE INVENTION

In a general embodiment, the present disclosure provides a class of donors containing both a carbamate and an ester function within a specific structure generates catalysts showing an interesting balance of activity and stereospecificity.

In a general embodiment, the present disclosure provides a catalyst component for the polymerization of olefins made from or containing Mg, Ti, halogen and an electron donor of formula (I) or (II)

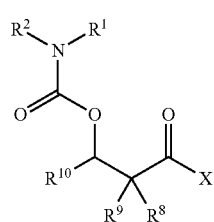

(I)

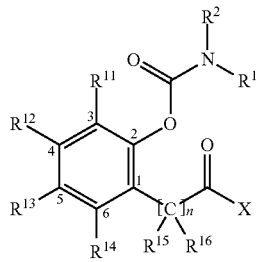

(II)

in which
$R^1$ and $R^2$, independently, are hydrogen or $C_1$-$C_{15}$ hydrocarbon groups;
X is a —$OR^3$ or a $NR^4R^5$ groups in which $R^3$ is selected from $C_1$-$C_{15}$ hydrocarbon groups, optionally containing a heteroatom selected from halogen, P, S, N, O and $R^4$-$R^5$ groups, independently, are hydrogen or $R^3$ groups which can be fused together to form a cycle;
$R^8$-$R^{10}$ groups are independently hydrogen or a $C_1$-$C_{20}$ hydrocarbon radicals, optionally substituted with heteroatoms selected from halogen, P, S, N, O and Si, which can be fused together to form one or more cycles;
$R^{15}$ to $R^{16}$ groups, equal to or different from each other, are hydrogen or $R^3$ groups which can be fused together to form one or more cycles, n is an integer from 0 to 2; and
$R^{11}$-$R^{14}$, independently, are selected from hydrogen, halogens or $C_1$-$C_{15}$ hydrocarbon groups optionally substituted with heteroatoms selected from halogen, P, S, N, O and Si.

DETAILED DESCRIPTION OF INVENTION

In some embodiments, structures of formula (II) are those in which at least one, of the and $R^{11}$-$R^{14}$ groups is/are different from hydrogen. In particular, alternatively structures are those in which the aromatic ring is substituted in position 3, 5 and/or 6. Substitution in positions 4, 3, and/or 6 is an alternative embodiment. In all these cases, and $R^{11}$-$R^{14}$ groups are selected from $C_1$-$C_5$ alkyl groups. In other embodiments the substitution in position 3 and/or 6 with a primary alkyl group especially methyl, and in position 4 and/or 5 with a tertiary alkyl group especially tert-butyl.

Still further embodiments of structures of formula (II) are those in which n is 1, alternatively combined with $R^{15}$ and $R^{16}$ being hydrogen (and in further embodiments when combined with the aromatic ring substituted as described above).

In the structures of formulae (I)-(II) X may be independently selected from either —$OR^3$ or —$NR^4R^5$. Alternatively, X may be selected from —$OR^3$ groups.

In the structures of formulae (I)-(II) the $R^3$ groups may be independently selected from $C_1$-$C_{15}$ alkyl groups, $C_6$-$C_{14}$ aryl groups, $C_3$-$C_{15}$ cycloalkyl groups, and $C_7$-$C_{15}$ arylalkyl or alkylaryl groups; the same may apply to $R^1$, $R^2$ and $R^3$ groups which can additionally be hydrogen. In additional embodiments, the $R^1$, $R^1$ and $R^3$ groups are independently selected from $C_1$-$C_{10}$ alkyl groups and alternatively still from $C_1$-$C_5$ alkyl groups in particular ethyl.

The final amount of electron donor compound in the solid catalyst component may range from 1 to 25% by weight (alternatively from about 3 to about 20% by weight) with respect to the total weight of the solid catalyst component.

In some embodiments, the structures according to formulae (I-II) are the following: ethyl 2-((diethylcarbamoyl)oxy)-3,5-diisopropylbenzoate, ethyl 2-((diethylcarbamoyl)oxy)-3,5-dimethylbenzoate, ethyl 2-((diethylcarbamoyl)oxy)-3-methylbenzoate, ethyl 2-((diethylcarbamoyl)oxy)-5-methylbenzoate, ethyl 2-((diethylcarbamoyl)oxy)benzoate ethyl 2-((dimethylcarbamoyl)oxy)benzoate, ethyl 2-((dipropylcarbamoyl)oxy)benzoate, ethyl 2-(carbamoyloxy)benzoate ethyl 5-(tert-butyl)-2-((diethylcarbamoyl)oxy)-3-methylbenzoate, ethyl 5-(tert-butyl)-2-((diethylcarbamoyl)oxy)benzoate, propyl 2-((diethylcarbamoyl)oxy)benzoate, 2-(diethylcarbamoyl)-4,6-diisopropylphenyl diethylcarbamate, 2-(diethylcarbamoyl)-4,6-dimethylphenyl diethylcarbamate, 2-(diethylcarbamoyl)-4-methylphenyl diethylcarbamate, 2-(diethylcarbamoyl)-6-methylphenyl diethyl carbamate, 2-(diethylcarbamoyl)phenyl carbamate, 2-(diethylcarbamoyl)phenyl diethylcarbamate, 2-(diethylcarbamoyl)phenyl dimethylcarbamate 2-(diethylcarbamoyl)phenyl dipropylcarbamate, 2-(dimethylcarbamoyl)phenyl dimethylcarbamate, 2-(dipropylcarbamoyl)phenyl diethylcarbamate, 2-carbamoylphenyl carbamate, 4-(tert-butyl)-2-(diethylcarbamoyl)-6-methylphenyl diethylcarbamate, 4-(tert-butyl)-2-(diethylcarbamoyl)phenyl diethylcarbamate, 2-(2-ethoxy-2-oxoethyl)phenyl piperidine-1-carboxylate, 2-(2-ethoxy-2-oxoethyl)phenyl pyrrolidine-1-carboxylate, ethyl 2-(2-((diethylcarbamoyl)oxy)-3,5-diisopropylphenyl)acetate, ethyl 2-(2-((diethylcarbamoyl)oxy)-3,5-dimethylphenyl)acetate ethyl 2-(2-((diethylcarbamoyl)oxy)-3-methylphenyl)acetate, ethyl 2-(2-((diethylcarbamoyl)oxy)-5-methylphenyl)acetate, ethyl 2-(2-((diethylcarbamoyl)oxy)phenyl)-3,3-dimethylbutanoate, ethyl 2-(2-((diethylcarbamoyl)oxy)phenyl)-3-methylbutanoate, ethyl 2-(2-((diethylcarbamoyl)oxy)phenyl)acetate, ethyl 2-(2-((diethylcarbamoyl)oxy)phenyl)butanoate, ethyl 2-(2-((diethylcarbamoyl)oxy)phenyl)pentanoate, ethyl 2-(2-((diethylcarbamoyl)oxy)phenyl)propanoate, ethyl 2-(2-((dimethylcarbamoyl)oxy)phenyl)acetate, ethyl 2-(2-((dipropylcarbamoyl)oxy)phenyl)acetate, ethyl 2-(2-(carbamoyloxy)phenyl)acetate, ethyl 2-(5-(tert-butyl)-2-((diethylcarbamoyl)oxy)-3-methylphenyl)-2-methylpropanoate, ethyl 2-(5-(tert-butyl)-2-((diethylcarbamoyl)oxy)-3-methylphenyl)acetate, ethyl 2-(5-(tert-butyl)-2-((diethylcarbamoyl)oxy)-3-methylphenyl)pentanoate, methyl 2-(2-((diethylcarbamoyl)oxy)phenyl)acetate, propyl 2-(2-((diethylcarbamoyl)oxy)phenyl)acetate, 2-(2-(diethylamino)-2-oxoethyl)-4,6-diisopropylphenyl diethylcarbamate, 2-(2-(diethylamino)-2-oxoethyl)phenyl carbamate, 2-(2-(diethylamino)-2-oxoethyl)phenyl diethylcarbamate, 4-(tert-butyl)-2-(2-(diethylamino)-2-oxoethyl)-6-methylphenyl diethylcarbamate, ethyl 3-(2-((diethylcarbamoyl)oxy)phenyl)-2-methylbutanoate, ethyl 3-(2-((diethylcarbamoyl)oxy)phenyl)propanoate, ethyl 3-(5-(tert-butyl)-2-((diethylcarbamoyl)oxy)-3-methylphenyl)propanoate, 2-(3-(diethylamino)-3-oxopropyl)phenyl diethylcarbamate, 2-(4-(diethylamino)-3-methyl-4-oxobutan-2-yl)phenyl diethylcarbamate, 4-(tert-butyl)-2-(3-(diethylamino)-3-oxopropyl)-6-methylphenyl diethylcarbamate, 4-ethoxy-4-oxobutan-2-yl piperidine-1-carboxylate, 4-ethoxy-4-oxobutan-2-yl pyrrolidine-1-carboxylate, butyl 3-((diethylcarbamoyl)oxy)-2-methylbutanoate, ethyl 3-((diethylcarbamoyl)oxy)-2,2,3-trimethylbutanoate, ethyl 3-((diethylcarbamoyl)oxy)-2,2-dimethylbutanoate, ethyl 3-((diethylcarbamoyl)oxy)-2,2-dimethylpropanoate, ethyl 3-((diethylcarbamoyl)oxy)-2-isobutyl-2-propylheptanoate, ethyl 3-((diethylcarbamoyl)oxy)-2-methylbutanoate, ethyl 3-((diethylcarbamoyl)oxy)-2-methylpentanoate, ethyl 3-((diethylcarbamoyl)oxy)-2-methylpropanoate, ethyl 3-((diethylcarbamoyl)oxy)butanoate, ethyl 3-((diethylcarbamoyl)oxy)propanoate, ethyl 3-((dimethylcarbamoyl)oxy)butanoate, ethyl 3-(carbamoyloxy)butanoate, propyl 3-((diethylcarbamoyl)oxy)-2-methylbutanoate, 4-(diethylamino)-3,3-dimethyl-4-oxobutan-2-yl diethylcarbamate, 4-(diethylamino)-3-methyl-4-oxobutan-2-yl diethylcarbamate, 4-(diethylamino)-4-oxobutan-2-yl diethylcarbamate, ethyl 2-((diethylcarbamoyl)oxy)-2-methylpropanoate, ethyl 2-((diethylcarbamoyl)oxy)-2-phenyl acetate, ethyl 2-((diethylcarbamoyl)oxy)-3,3-dimethylbutanoate, ethyl 4-((diethylcarbamoyl)oxy)-2-methylbutanoate, ethyl 4-((diethylcarbamoyl)oxy)butanoate, ethyl 4-((diethylcarbamoyl)oxy)pentanoate, ethyl 8-((diethylcarbamoyl)oxy)-1-naphthoate, 4-(diethylamino)-3-methyl-4-oxobutyl diethylcarbamate, 4-(diethylamino)-4-oxobutyl diethylcarbamate, 5-(diethylamino)-5-oxopentan-2-yl diethylcarbamate.

In some embodiments, the compounds falling in formulae (I)-(II) can be prepared by reacting a hydroxyester or hydroxyamide of general formula HO-A-COX with a carbamoyl chloride $R^1R^2N$—CO—Cl in the presence of base such as a tertiary amine. In some embodiments, the amount of Ti atoms in the solid catalyst component may be higher than 2.5% wt (alternatively higher than 3.0%) with respect to the total weight of said solid catalyst component.

The catalyst components of the present disclosure may comprise, in addition to the above electron donors, Ti, Mg and halogen. In particular, the catalyst components may comprise a titanium compound, having at least a Ti-halogen bond and the electron donor compounds supported on a Mg halide. The magnesium halide may be $MgCl_2$ in active form which is disclosed as a support for Ziegler-Natta catalysts. U.S. Pat. No. 4,298,718 and U.S. Pat. No. 4,495,338 describe the use of these compounds in Ziegler-Natta catalysis. These patents disclose embodiments wherein magnesium dihalides in active form used as support or co-support in components of catalysts for the polymerization of olefins characterized by X-ray spectra in which the most intense diffraction line that appears in the spectrum of the non-active halide is diminished in intensity and is replaced by a halo whose maximum intensity is displaced towards lower angles relative to that of the more intense line.

In some embodiments, the titanium compounds used in the catalyst component may be $TiCl_4$ and $TiCl_3$. In some embodiments, the titanium compounds are Ti-haloalcoholates of formula $Ti(OR)_{m-y}X_y$, where m is the valence of titanium, y is a number between 1 and m-1, X is halogen and R is a hydrocarbon radical having from 1 to 10 carbon atoms.

In some embodiments, the preparation of the solid catalyst component can be carried out according to several methods. One method includes a reaction between magnesium alcoholates or chloroalcoholates and an excess of $TiCl_4$ in the presence of the electron donor compounds at a temperature of about 80 to about 120° C.

In some embodiments, the solid catalyst component is prepared by reacting a titanium compound of formula $Ti(OR)_{m-y}X_y$, where m is the valence of titanium and y is a number between 1 and m, alternatively $TiCl_4$, with a magnesium chloride deriving from an adduct of formula $MgCl_2 \cdot pROH$, where p is a number between 0.1 and 6, alternatively from 2 to 3.5, and R is a hydrocarbon radical having 1-18 carbon atoms. In some embodiments, the adduct is prepared in spherical form by mixing alcohol and magnesium chloride in the presence of an inert hydrocarbon immiscible with the adduct, operating under stirring conditions at the melting temperature of the adduct (100-130° C.).

Then, the emulsion may be quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with Ti compound or it can be previously subjected to thermal controlled dealcoholation (80-130° C.) so as to obtain an adduct in which the number of moles of alcohol is lower than 3, preferably between 0.1 and 2.5. The reaction with the Ti compound can be carried out by suspending the adduct (dealcoholated or as such) in cold $TiCl_4$; the mixture may be heated up to 80-130° C. and kept at this temperature for 0.5-2 hours. The treatment with $TiCl_4$ can be carried out one or more times. The electron donor compound may be added during the treatment with $TiCl_4$. In some embodiments, the catalyst components are prepared in spherical form as described in European Patent Application Nos. EP-A-395083, EP-A-553805, EP-A-553806, and EPA601525, or Patent Cooperation Treaty Publication No. WO98/44001, incorporated herein by reference.

In some embodiments, the solid catalyst components may have a surface area (by B.E.T. method) between about 20 and about 500 m²/g and alternatively between about 50 and about 400 m²/g, and a total porosity (by B.E.T. method) higher than 0.2 cm³/g alternatively between about 0.2 and about 0.6 cm³/g. The porosity (Hg method) due to pores with radius up to about 10.000 Å ranges from about 0.3 to about 1.5 cm³/g, alternatively from about 0.45 to about 1 cm³/g.

In some embodiments, the solid catalyst component has an average particle size ranging from about 5 to about 120 m and alternatively from about 10 to about 100 μm.

In some embodiments, the desired electron donor compounds can be added or, alternatively, obtained in situ by using an appropriate precursor capable to be transformed in the electron donor compound. In some embodiments, the in situ process can be achieved by chemical reactions such as transesterification.

In some embodiments, the final amount of the electron donor compound of formula (I) may be such that its molar ratio with respect to the Ti atoms is from about 0.01 to about 2, alternatively from about 0.05 to about 1.5.

In some embodiments, the solid catalyst components may be converted into catalysts for the polymerization of olefins by reacting the solid catalyst components with organoaluminum compounds according to available methods.

In an embodiment, the present disclosure provides a catalyst for the polymerization of olefins $CH_2=CHR$, in which R is hydrogen or a hydrocarbyl radical with 1-12 carbon atoms, made from or containing a product obtained by contacting:
(i) the solid catalyst component and
(ii) an alkylaluminum compound and optionally,
(iii) an external electron donor compound.

The alkyl-Al compound (ii) may be chosen among the trialkyl aluminum compounds, including, for example triethylaluminum, triisobutylaluminum, tri-n-butylaluminum, tri-n-hexylaluminum, and tri-n-octylaluminum. In some embodiments, the alkyl-Al compound is selected from the group consisting of alkylaluminum halides, alkylaluminum hydrides or alkylaluminum sesquichlorides. In some embodiments, the alkyl-Al compound is selected from the group consisting of $AlEt_2Cl$ and $Al_2Et_3Cl_3$. In some embodiments, the alkyl-Al compound is a mixture including trialkylaluminums.

In some embodiments, the external electron-donor compounds may include silicon compounds, ethers, esters, amines, heterocyclic compounds and ketones. In some embodiments, the external electron-donor compound is 2,2,6,6-tetramethylpiperidine.

An alternative class of external donor compounds are silicon compounds of formula $(R^7)_a(R^8)_b Si(OR_9)_c$, where a and b are integers from 0 to 2, c is an integer from 1 to 4 and the sum (a+b+c) is 4; $R_7$, $R_8$, and $R_9$, are radicals with 1-18 carbon atoms optionally containing heteroatoms. In various embodiments the silicon compounds in which a is 1, b is 1, c is 2, at least one of $R_7$ and $R_8$ may be selected from branched alkyl, cycloalkyl or aryl groups with 3-10 carbon atoms optionally containing heteroatoms and $R_9$ is a $C_1$-$C_{10}$ alkyl group, in particular methyl. Examples of silicon compounds are selected from the group consisting of methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, methyl(3,3,3-trifluoro-n-propyl)dimethoxysilane, N,N-diethylaminotriethoxysilane. Additional examples of silicon compounds are those in which a is 0, c is 3, $R_8$ is a branched alkyl or cycloalkyl group, optionally containing heteroatoms, and $R_9$ is methyl. Still further examples of silicon compounds are selected from the group consisting of cyclohexyltrimethoxysilane, t-butyltrimethoxysilane and thexyltrimethoxysilane.

In some embodiments, the electron donor compound (iii) may be used in an amount to give a molar ratio between the organoaluminum compound and the electron donor compound (iii) of from about 0.1 to about 500, alternatively from about 1 to about 300 and alternatively from about 3 to about 100.

The present disclosure further provides a process for the (co)polymerization of olefins $CH_2=CHR$, in which R is hydrogen or a hydrocarbyl radical with 1-12 carbon atoms, carried out in the presence of a catalyst made from or containing a product of the reaction between:
(i) the solid catalyst component;
(ii) an alkylaluminum compound and,
(iii) optionally an electron-donor compound (external donor).

In some embodiments, the polymerization process is carried out in slurry polymerization using, as diluent, an inert hydrocarbon solvent, or bulk polymerization using the liquid monomer as a reaction medium. In some embodiment, the liquid monomer is propylene. In some embodiments, the polymerization process occurs in gas-phase operating in one or more fluidized or mechanically agitated bed reactors.

In some embodiments, the polymerization may be carried out at temperature of from about 20 to about 120° C., alternatively from about 40 to about 80° C. When the polymerization is carried out in gas-phase the operating pressure may be between about 0.5 and about 5 MPa, alternatively between about 1 and about 4 MPa. In the bulk polymerization the operating pressure may be between about 1 and about 8 MPa, alternatively between about 1.5 and about 5 MPa.

The following examples are given in order to further illustrate the present disclosure without being intended as limiting it.

Characterizations
Determination of X.I.
In a round-bottomed flask provided with a cooler and reflux condenser, 2.5 g of polymer and 250 ml of o-xylene were placed and kept under nitrogen. The mixture was heated to 135° C. and kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of the xylene-soluble fraction was expressed as a percentage of the original 2.5 grams and then, by difference, the X.I. %.

Determination of Donors.

The content of electron donor was determined by gas-chromatography. The solid component was dissolved in acidic water. The solution was extracted with ethyl acetate, an internal standard was added, and a sample of the organic phase was analyzed in a gas chromatograph, to determine the amount of donor present at the starting catalyst compound.

Melt Flow Rate (MFR)

The melt flow rate MIL of the polymer was determined according to ISO 1133 (230° C., 2.16 Kg).

EXAMPLES

N—Z-L-proline methyl ester used in comparative example 1 is available from Sigma-Aldrich.

General Procedure for Preparation of the Spherical Adducts

An initial amount of microspheroidal $MgCl_2.2.8C_2H_5OH$ was prepared according to the method described in Example 2 of Patent Cooperation Treaty Publication No. WO98/44009, incorporated herein by reference but operating on larger scale.

General Procedure for the Preparation of the Solid Catalyst Component

Into a 500 mL round bottom flask, equipped with mechanical stirrer, cooler and thermometer 250 mL of $TiCl_4$ were introduced at room temperature under nitrogen atmosphere. After cooling to 0° C., while stirring, the internal donor and 10.0 g of the spherical adduct were sequentially added into the flask. The charged internal donor was in an amount sufficient to charge a Mg/donor molar ratio of 6. The temperature was raised to 100° C. and maintained for 2 hours. Thereafter, stirring was stopped, the solid product was allowed to settle and the supernatant liquid was siphoned off at 100° C. After the supernatant was removed, additional fresh $TiCl_4$ was added to reach the initial liquid volume again. The mixture was then heated at 120° C. and kept at this temperature for 1 hour. Stirring was stopped again. The solid was allowed to settle. The supernatant liquid was siphoned off.

The solid was washed with anhydrous hexane six times (6×100 mL) in temperature gradient down to 60° C. and one time (100 mL) at room temperature. The solid was then dried under vacuum and analyzed.

General Procedure for the Polymerization of Propylene

A 4-liter steel autoclave equipped with a stirrer, pressure gauge, thermometer, catalyst feeding system, monomer feeding lines and thermostating jacket, was purged with nitrogen flow at 70° C. for one hour. Then, at 30° C. under propylene flow, the autoclave was charged in sequence with 75 mL of anhydrous hexane, 0.76 g of $AlEt_3$, the external electron donor indicated in Table 1 (if used) and 0.006÷0.010 g of solid catalyst component. The autoclave was closed; subsequently 2.0 NL of hydrogen were added. Then, under stirring, 1.2 kg of liquid propylene was fed. The temperature was raised to 70° C. in five minutes and the polymerization was carried out at this temperature for two hours. At the end of the polymerization, the non-reacted propylene was removed; the polymer was recovered and dried at 70° C. under vacuum for three hours. Then the polymer was weighed and fractionated with o-xylene to determine the amount of the xylene insoluble (X.I.) fraction.

Donor Synthesis

Synthesis of the Donor Used in Example 1

A mixture of 3,5-diisopropyl-2-hydroxybenzoic acid (8.00 g, 36.2 mmol) and thionyl chloride (20 mL) was heated at reflux for 1 h. After cooling excess thionyl chloride was removed in vacuo and the residue was taken up in dichloromethane (50 mL). The dichloromethane solution was then added dropwise to a solution of diethylamine (20 mL) in dichloromethane (100 mL), cooled to 0° C. and the resulting solution was left to stir for 1 h. The excess diethylamine and dichloromethane was removed in vacuo and the residue taken up with dichloromethane (300 mL). The organic phase was washed with 1M hydrochloric acid (100 mL), water (100 mL), dried (MgSO4), filtered and the solvent removed in vacuo. The residue was dissolved in toluene (100 mL) then TiCl4 was added (4 mL, 36.2 mmol), followed by diethylcarbamoyl chloride (5 mL, 39 mmol). After two hours at room temperature the mixture was carefully quenched with acidic water then the organic layer was separated and washed with water until neutral pH, then was anhydrified over Na2SO4 and the solvent was distilled off to afford pure 2-(diethylcarbamoyl)-4,6-diisopropylphenyl diethylcarbamate.

Synthesis of the Donor Used in Example 2

First step: 2-Hydroxyphenylacetic acid (10 g, 65 mmol) was treated with 20 mL of ethanol and 0.5 mL of concentrated H2SO4 at reflux until TLC show the esterification was completed. Then the mixture was diluted with water and diethyl ether the organic layer was separated and washed with water until neutral pH, then was anhydrified over Na2SO4 and the solvent was distilled off to afford pure ethyl 2-hydroxyphenylacetate (yield 98%).

Second step: In a 250 mL round bottom flask, under nitrogen was introduced THF (80 mL), NaH (1.5 g, 61 mmol), diethylcarbamoyl chloride (6.7 mL, 67 mmol) and ethyl 2-hydroxyphenylacetate (11 g, 61 mmol) dissolved in 15 mL of THF was added dropwise under stirring and cooling. The mixture was stirred at room temperature until GC show the starting material was complete converted into product. Then the reaction mixture was worked-up to afford ethyl 2-(2-((diethylcarbamoyl)oxy)phenyl)acetate (16 g, 94% yield) with a GC purity of 98%.

Synthesis of the Donor Used in Examples 3-4

Ethyl 2-(5-(tert-butyl)-2-((diethylcarbamoyl)oxy)-3-methylphenyl)acetate

First step: In a 500 mL round bottom flask, under nitrogen at room temperature, the following components were introduced: 2,6-xylenol (54.5 g, 0.45 mol), heptane (130 mL), and tert-butanol (66 g, 0.9 mol), then concentrated H2SO4. (28.4 mL, 0.54 mol) was added dropwise under stirring. After one hour the reaction was completed and the mixture was diluted with water and diethyl ether. The organic layer was separated and washed with water until neutral pH, then it was anhydrified over Na2SO4 and the solvent was distilled off to afford 81.3 g of 4-tert-butyl-2,6-xylenol with a GC purity of 98% wt (yield 98%).

Second step: In a 2 liter round bottom flask, under nitrogen was introduced 4-tert-butyl-2,6-xylenol (132.4 g, 0.74 mol), THF (750 mL) and sodium ethoxide (62.9 g, 0.9 mol). After 30 minute of post-reaction time diethylcarbamoyl chloride (122 mL, 0.97 mol) was added slowly dropwise. The reaction was monitored via GC and extra sodium ethoxide and diethylcarbamoyl chloride were added to convert completely the starting. Then the mixture was diluted with water and i-hexanes, the organic layer was separated and washed with water until neutral pH, then was anhydrified over Na2SO4 and the solvent was distilled off to afford 197.8 g of 4-(tert-butyl)-2,6-dimethylphenyl diethylcarbamate with a GC purity of 98% wt (yield 94%) which solidified upon standing.

Third step: In a 2 liter round bottom flask, under nitrogen were introduced THF (770 mL), 4-(tert-butyl)-2,6-dimethylphenyl diethylcarbamate (173.5 g, 0.63 mol) and diisopropylamine (8.8 mL, 0.063 mol) then the mixture was cooled to 0° C. and n-BuLi was added dropwise (solution 2.5 mol/L in hexanes, 520 mL, 1.3 mol). Then the cooling bath was removed and the reaction was let to warm to room temperature. After 30 minutes at this temperature the reaction was diluted with water and ethyl acetate. The organic layer was separated and washed with water until neutral pH, then was anhydrified over Na2SO4 and the solvent was distilled off to afford 177.4 g of 2-(5-(tert-butyl)-2-hydroxy-3-methylphenyl)-N,N-diethylacetamide with a purity GC of 94% (yield 96%).

Fourth step: In a round bottom flask were introduced 2-(5-(tert-butyl)-2-hydroxy-3-methylphenyl)-N,N-diethylacetamide (purity 94% from the previous step, 170 g, 0.57 mol), ethanol (200 mL) and concentrated H2SO4 (30.4 mL, 0.57 mol). The mixture was brought to reflux and kept at this temperature for 5 hours then was diluted with water and ethyl acetate. The organic layer was separated and washed with water until neutral pH, then was anhydrified over Na2SO4 and the solvent was distilled off to afford a dark oil which was purified via heptane crystallization to afford 86.1 g of 5-(tert-butyl)-7-methylbenzofuran-2(3H)-one with a GC purity of 98% wt (yield 72%).

Fifth step: 5-(tert-butyl)-7-methylbenzofuran-2(3H)-one (83.4 g, 0.4 mol) from the previous step was treated with ethanol (200 mL) and a catalytic amount of concentrated H2SO4 at reflux for 30 minutes then the mixture was worked-up to afford ethyl 2-(5-(tert-butyl)-2-hydroxy-3-methylphenyl)acetate.

Sixth step: In a 250 mL round bottom flask, under nitrogen were introduced THF (100 mL) ethyl 2-(5-(tert-butyl)-2-hydroxy-3-methylphenyl)acetate (10 g, 0.040 mol), sodium ethoxide (2.9 g, 0.042 mol) then diethylcarbamoyl chloride (5.3 mL, 0.042 mol) was added slowly dropwise. After 18 hours at room temperature the reaction was complete and the mixture was worked-up to afford ethyl 2-(5-(tert-butyl)-2-((diethylcarbamoyl)oxy)-3-methylphenyl)acetate.

Examples 1-3 and Comparative 1

The catalyst components were prepared using the donors indicated in Table 1. The solid catalyst components were analyzed for their composition and tested in polymerization of propylene. The results are listed in Table 1.

Example 4

The catalyst component was prepared according to the general procedure with the difference that the, were used 10.0 g of a spherical adduct prepared as described in the general procedure and then subject to thermal dealcoholation treatment until the alcohol content was lowered to 47% wt. Moreover, the first reaction step with TiCl4 was carried out at a temperature of 120° for two hours, the second reaction step with TiCl4 was also carried out at a temperature of 120° for 0.5 hours and an additional third step of reaction with TiCl4 was carried out at a temperature of 120° for 0.5 hours.

TABLE 1

| | Catalyst compostion | | | Polymerization | | |
|---|---|---|---|---|---|---|
| | Internal Donor | Ti | | Mileage | XI | MIL |
| | Name | % wt | % wt | ED | kg/g | % wt | g/10' |
| 1 | [structure: 2,6-diisopropyl substituted phenyl with CONEt2 and O-C(O)-NEt2] | 5.0 | 4.0 | D | 21.5 | 94.7 | 7.8 |
| 2 | [structure: phenyl with CH2COOEt and O-C(O)-NEt2] | nd | 3.0 | D | 19.2 | 95.8 | 1.2 |
| 3 | [structure: 4-tert-butyl-6-methyl phenyl with CH2COOEt and O-C(O)-NEt2] | 17.3 | 4 | D | 86.5 | 98.8 | 0.5 |

TABLE 1-continued

| | Catalyst compostion | | | Polymerization | | |
|---|---|---|---|---|---|---|
| | Internal Donor | | Ti | Mileage | XI | MIL |
| | Name | % wt | % wt | ED | kg/g | % wt | g/10' |
| 4 | " | 17.0 | 3 | D | 66.3 | 98.5 | 1.2 |
| C 1 | 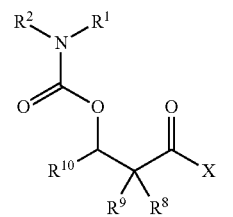 N-L-Z-Proline methyl ester | n.d. | 5.4 | D | 13 | 93.1 | 6.9 |

ED: External Donor.
D: dicyclopentyldimethoxysilane
nd: not determined

What is claimed is:

1. A solid catalyst component for the polymerization of olefins comprising:
   (i) Mg,
   (ii) Ti,
   (iii) halogen,
   (iv) and an electron donor of formula (I) or (II)

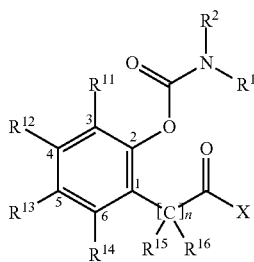

in which
$R^1$ and $R^2$, independently, are hydrogen or $C_1$-$C_{15}$ hydrocarbon groups;
X is a —$OR^3$ or a —$NR^4R^5$ groups in which $R^3$ is selected from $C_1$-$C_{15}$ hydrocarbon groups, optionally containing a heteroatom selected the group consisting of halogens, P, S, N, O and $R^4$-$R^5$ groups, independently, are hydrogen or $R^3$ groups which are optionally fused together to form a cycle;
$R^8$-$R^{10}$ groups are independently hydrogen or a $C_1$-$C_{20}$ hydrocarbon radicals, optionally substituted with heteroatoms selected from the group consisting of halogens, P, S, N, O and Si, which are optionally fused together to form one or more cycles;
$R^{15}$ to $R^{16}$ groups, which are the same or different from each other, are hydrogen or $R^3$ groups which are optionally fused together to form one or more cycles, n is an integer from 0 to 2; and
$R^{11}$-$R^{14}$, independently, are selected from hydrogen, halogens or $C_1$-$C_{15}$ hydrocarbon groups optionally substituted with heteroatoms selected from the group consisting of halogens, P, S, N, O and Si.

2. The catalyst component according to claim 1, wherein the electron donor of formula (II) the aromatic ring is substituted in position 3 and/or 6 with a primary alkyl group.

3. The catalyst component according to claim 2, wherein the primary alkyl group is methyl.

4. The catalyst component according to claim 1, wherein the electron donor of formula (II) the aromatic ring is substituted in position 4, in position 5, or in both positions with a tertiary alkyl group.

5. The catalyst component according to claim 4, wherein the tertiary alkyl group is t-butyl.

6. The catalyst component according to claim 1, wherein the electron donor of formula (II) n is 1.

7. The catalyst component according to claim 1, wherein $R^3$ groups are independently selected from the group consisting of $C_1$-$C_{15}$ alkyl groups, $C_6$-$C_{14}$ aryl groups, $C_3$-$C_{15}$ cycloalkyl groups, and $C_7$-$C_{15}$ arylalkyl or alkylaryl groups and $R^4$-$R^5$ groups are hydrogen or have the same meaning as $R^3$.

8. The catalyst component according to claim 7, wherein $R^1$, $R^2$ and $R^3$ groups are independently selected from $C_1$-$C_5$ alkyl groups.

9. The catalyst component according to claim 8, wherein $R^1$, $R^2$ and $R^3$ groups are ethyl.

10. The catalyst component according to claim 1, wherein X is $OR^3$.

11. The catalyst component according to claim 1, wherein the final amount of electron donor compound in the solid catalyst component ranges from 1 to 25% by weight with respect to the total weight of the solid catalyst component.

12. A catalyst for the polymerization of olefins comprising the product of the reaction between:
    (i) the solid catalyst component according to claim 1 and
    (ii) an alkylaluminum compound and optionally,
    (iii) an external electron donor compound.

13. The catalyst according to claim 12, further comprising an external electron donor compound.

14. The catalyst according to claim 13, wherein the electron donor compound is selected from silicon compounds of formula $(R_7)_a(R_8)_bSi(OR_9)_c$, where a and b are integers from 0 to 2, c is an integer from 1 to 4 and the sum (a+b+c) is 4; $R_7$, $R_8$, and $R_9$ are radicals with 1-18 carbon atoms optionally containing heteroatoms.

15. A process for the (co)polymerization of olefins $CH_2$=CHR, wherein R is hydrogen or a hydrocarbyl radical with 1-12 carbon atoms, carried out in the presence of a catalyst system comprising the product of the reaction between:
  i. the solid catalyst component according to claim 1;
  ii. an alkylaluminum compound and,
  iii. optionally an external donor compound.

* * * * *

UNITED STATES PATENT AND TRADEMARK OFFICE
CERTIFICATE OF CORRECTION

| | | |
|---|---|---|
| PATENT NO. | : 10,017,590 B2 | Page 1 of 1 |
| APPLICATION NO. | : 15/557011 | |
| DATED | : July 10, 2018 | |
| INVENTOR(S) | : Mignogna et al. | |

It is certified that error appears in the above-identified patent and that said Letters Patent is hereby corrected as shown below:

In the Specification

In Column 2, Line 59, after "and" delete "$R^3$"

In Column 2, Line 61, delete "$R^1$, $R^1$" and insert -- $R^1$, $R^2$ --

In Column 5, Line 32, delete "m" and insert -- µm --

In Column 5, Line 38, delete "transterification." and insert -- transesterification. --

In Column 8, Line 45, delete "complete" and insert -- completely --

In Column 9, Line 2, delete "minute" and insert -- minutes --

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*